(12) United States Patent  (10) Patent No.: US 12,054,343 B2
Caltabiano  (45) Date of Patent: Aug. 6, 2024

(54) SYSTEM AND METHOD FOR CONTROLLING A PACKAGING MACHINE

(71) Applicant: Tetra Laval Holdings & Finance S.A., Pully (CH)

(72) Inventor: Daniele Caltabiano, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 765 days.

(21) Appl. No.: 17/275,334

(22) PCT Filed: Aug. 2, 2019

(86) PCT No.: PCT/EP2019/070933
§ 371 (c)(1),
(2) Date: Mar. 11, 2021

(87) PCT Pub. No.: WO2020/048703
PCT Pub. Date: Mar. 12, 2020

(65) Prior Publication Data
US 2022/0048714 A1  Feb. 17, 2022

(30) Foreign Application Priority Data
Sep. 7, 2018  (EP) .................................... 18193255

(51) Int. Cl.
*B65G 43/00* (2006.01)
*G05B 15/02* (2006.01)
(52) U.S. Cl.
CPC ............. *B65G 43/00* (2013.01); *G05B 15/02* (2013.01)
(58) Field of Classification Search
CPC ... B65G 43/00; G05B 15/02; G05B 19/41895
See application file for complete search history.

(56) References Cited

U.S. PATENT DOCUMENTS 9,671,418 B2 * 6/2017 Mellars .................. G01N 35/00
10,155,604 B2 * 12/2018 Dörenberg .............. B65B 35/44
(Continued)

FOREIGN PATENT DOCUMENTS

CN  110228685 A  *  9/2019  ............ B65G 25/06
EP  3291039       3/2018
EP  3620876 A1  *  3/2020  ............ B65B 57/12

OTHER PUBLICATIONS

International Search Report and Written Opinion issued in Application No. PCT/EP2019/070933 dated Aug. 10, 2019.

*Primary Examiner* — Patrick H Mackey
(74) *Attorney, Agent, or Firm* — Knobbe, Martens, Olson & Bear, LLP

(57) ABSTRACT

A method is disclosed comprising controlling a packaging machine having independently movable objects along a track, moving object volumes of a leading object and a trailing object along a section of a coordinate system, determine a set of minimum separation distances between the object coordinates of the leading and trailing objects over an interval, associating object coordinates of the trailing object and the corresponding minimum separation distances in a first function, and for a selected object coordinate communicated to a selected movable object, determine the corresponding minimum separation distance from the first function, comparing the minimum separation distance from the first function with a resulting separation between said selected object coordinate and an object coordinate of a movable object closest downstream of the selected movable object.

19 Claims, 7 Drawing Sheets

(56) References Cited

U.S. PATENT DOCUMENTS

| | | | |
|---|---|---|---|
| 10,442,637 B2* | 10/2019 | Huang | B65G 54/02 |
| 10,766,513 B2* | 9/2020 | Takagawa | B65G 35/06 |
| 10,947,049 B2* | 3/2021 | Andreae | B65G 19/025 |
| 2001/0019006 A1 | 9/2001 | Stauber | |
| 2014/0350719 A1 | 11/2014 | Fleischmann et al. | |
| 2015/0355211 A1 | 12/2015 | Mellars et al. | |
| 2016/0011224 A1 | 1/2016 | Pollack | |
| 2018/0057261 A1* | 3/2018 | Takagawa | G05B 19/41895 |
| 2018/0134433 A1 | 5/2018 | Dorenberg | |

* cited by examiner

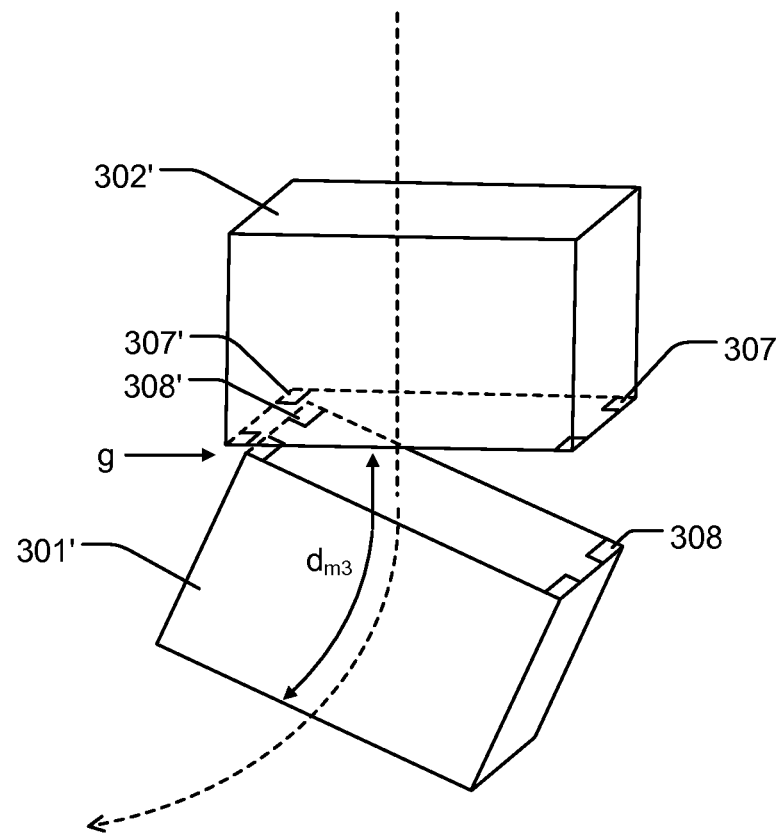
Fig. 6
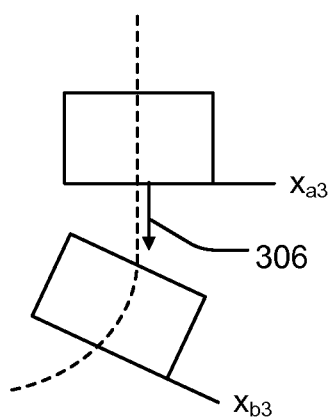 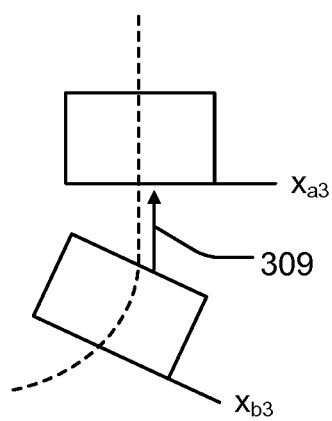
Fig. 7a    Fig. 7b

SYSTEM AND METHOD FOR CONTROLLING A PACKAGING MACHINE

TECHNICAL FIELD

The invention relates to a system for controlling a packaging machine having independently movable objects configured to manipulate packaging containers, and to a method of controlling a packaging machine.

BACKGROUND

Various systems exist for controlling the motion of e.g. packaging containers when transported along conveyor tracks in a package container production line. Manipulation of the motion trajectories of such packaging containers is associated with several challenges in high-speed production lines where increased throughput is desired. The packaging containers undergo a sequence of operations executed in the production line. The various operations may require e.g. manipulation of the positions of the packaging containers, such as moving groups of packaging containers from a main flow of packaging containers, in order to direct the groups of packaging containers to different applications, e.g. sealing or wrapping operations. Conveyor systems based on linear motor technology have been proposed for manipulating the packaging containers in these situations. These conveyor systems typically comprise a closed loop track, and a plurality of movable objects or carts, which are independently moved along the track by individually controlling a plurality of solenoids along the track. The independently movable objects or carts are controlled to engage the packaging containers in various operations.

A problem arises in manufacturing industries such as in the packaging industry where a multitude of independently movable objects in a machine, such as the movable objects or carts for manipulating packaging containers, needs to be re-positioned or calibrated or otherwise manually displaced in various procedures. There is an associated risk of collision between the objects since they are independently movable along the track in the packaging machine. Further, each of the independently movable typically comprise a number of moving elements, which assume different configurations in dependence on the current location on the track. This causes variations in the orientation and in the shape or volume occupied by each of the independently movable objects in the machine, depending on the aforementioned location on the track. Previous solutions for addressing the risk of collisions are complex and cumbersome to implement, as the configuration of the independently movable objects is highly dependent on the various applications in which such systems are utilized, in addition to the described variability when the objects move along the track. Customization, maintenance and calibration operations thus demand for an increased amount of resources and are associated with increased risk of collisions between the movable objects.

SUMMARY

It is an object of the invention to at least partly overcome one or more limitations of the prior art. In particular, it is an object to provide an improved method and system for controlling a packaging machine, in particular allowing for reducing the risk of collisions between objects being independently movable along a track in the packaging machine during calibration and re-positioning procedures of such independently movable objects.

In a first aspect of the invention, this is achieved by a method of controlling a packaging machine comprising independently movable objects configured to manipulate packaging containers, the independently movable objects communicating with a control unit configured to control the positions of the independently movable objects along a track, each of the movable objects occupies a respective object volume and has a respective object coordinate in a coordinate system of the track. The method comprises moving object volumes of a leading object and a trailing object along a section of the coordinate system in a first direction of the coordinate system, the object volume of the trailing object being upstream of the object volume of the leading object with respect to the first direction, wherein, at defined intervals of object coordinates of the leading object along the section. The method comprises determining a set of minimum separation distances between the object coordinates of the leading and trailing objects over the interval, whereby the space occupied by the object volumes of the leading and trailing object is different for each minimum separation distance in the set, registering object coordinates of the trailing object at each minimum separation distance in the set, associating the object coordinates of the trailing object and the corresponding minimum separation distances in a first function, whereby, for a selected object coordinate to be subsequently communicated by the control unit to a selected movable object, for moving the selected movable object along the track. The method comprises determining the corresponding minimum separation distance from the first function, comparing the minimum separation distance from the first function with a resulting separation between said selected object coordinate and an object coordinate of a movable object closest downstream of the selected movable object, with respect to a direction of movement of the selected movable object, to determine the resulting separation as being smaller or larger than the minimum separation distance.

In a second aspect of the invention, this is achieved by a system for controlling a packaging machine having a control unit configured to control the positions of independently movable objects along a track of the packaging machine, the independently movable objects being configured to manipulate packaging containers, each of the movable objects occupies a respective object volume and has a respective object coordinate in a coordinate system of the track. The system comprises a processing unit configured to communicate with the control unit and being configured to move object volumes of a leading object and a trailing object along a section of the coordinate system in a first direction of the coordinate system, the object volume of the trailing object being upstream of the object volume of the leading object with respect to the first direction, wherein, at defined intervals of object coordinates of the leading object along the section. The processing unit is configured to determine a set of minimum separation distances between the object coordinates of the leading and trailing objects over the interval, whereby the space occupied by the object volumes of the leading and trailing objects is different for each minimum separation distance in the set. The processing unit is configured to; register object coordinates of the trailing object at each minimum separation distance in the set, associate the object coordinates of the trailing object and the corresponding minimum separation distances in a first function, whereby, for a selected object coordinate to be subsequently communicated by the control unit to a selected movable object, for moving the selected movable object along the track. The processing unit is configured to determine the corresponding minimum separation distance from the first function, compare the minimum separation distance from the first function with a resulting separation between said selected object coordinate and an object coordinate of a movable object closest downstream of the selected movable object, with respect to a direction of movement of the selected movable object, to determine the resulting separation being smaller or larger than the minimum separation distance.

In a third aspect of the invention, this is achieved by a computer program product comprising instructions which, when the program is executed by a computer, cause the computer to carry out the steps of the method according to the first aspect.

In a fourth aspect of the invention, this is achieved by a packaging machine comprising a system according to the second aspect, and/or a packaging machine performing the method according to the first aspect.

Further examples of the invention are defined in the dependent claims, wherein features for the first aspect may be implemented for the second and subsequent aspects, and vice versa.

By determining a set of minimum separation distances between object coordinates of leading and trailing objects over an interval, and associating the object coordinates and the corresponding minimum separation distances in a first function, provides for determining a subsequent minimum separation associated with a particular coordinate on the track to which a selected object is intended to move. The minimum separation distance between adjacent objects as a function of the track coordinate can accordingly be taken into account and the selected object can be safely moved to intended coordinate or to a new coordinate so that the required minimum separation distance is fulfilled.

Still other objectives, features, aspects and advantages of the invention will appear from the following detailed description as well as from the drawings.

DRAWINGS

Embodiments of the invention will now be described, by way of example, with reference to the accompanying schematic drawings.

FIG. 6 is a schematic illustration of two object volumes of two adjacent objects in a coordinate system of a track;

Figure 8A:
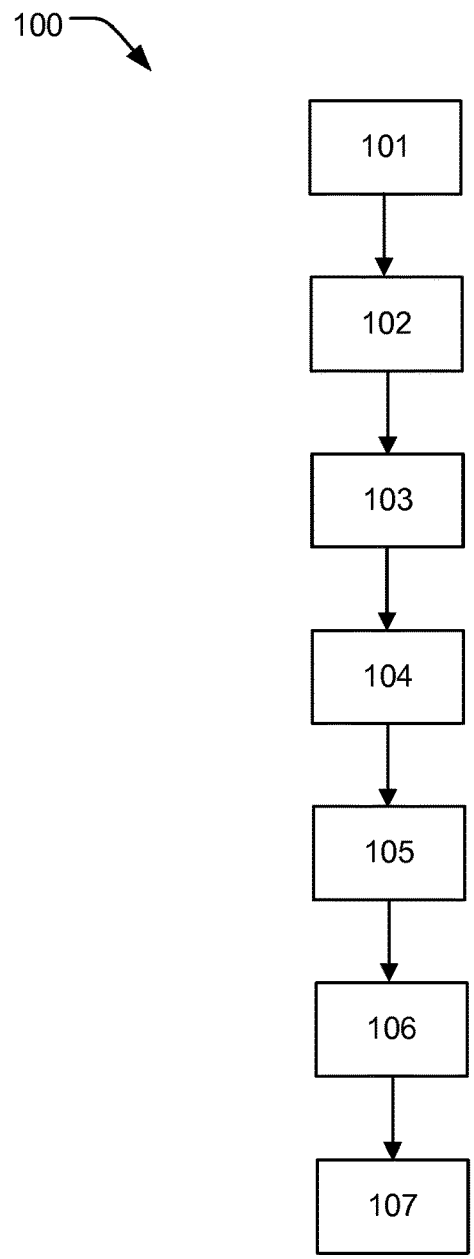

FIGS. 7a-b are schematic illustrations of two object volumes of two adjacent objects in a coordinate system of a track when moving in two different and opposite directions;

FIG. 8a is a flowchart of a method of controlling a packaging machine; and

Figure 8B:
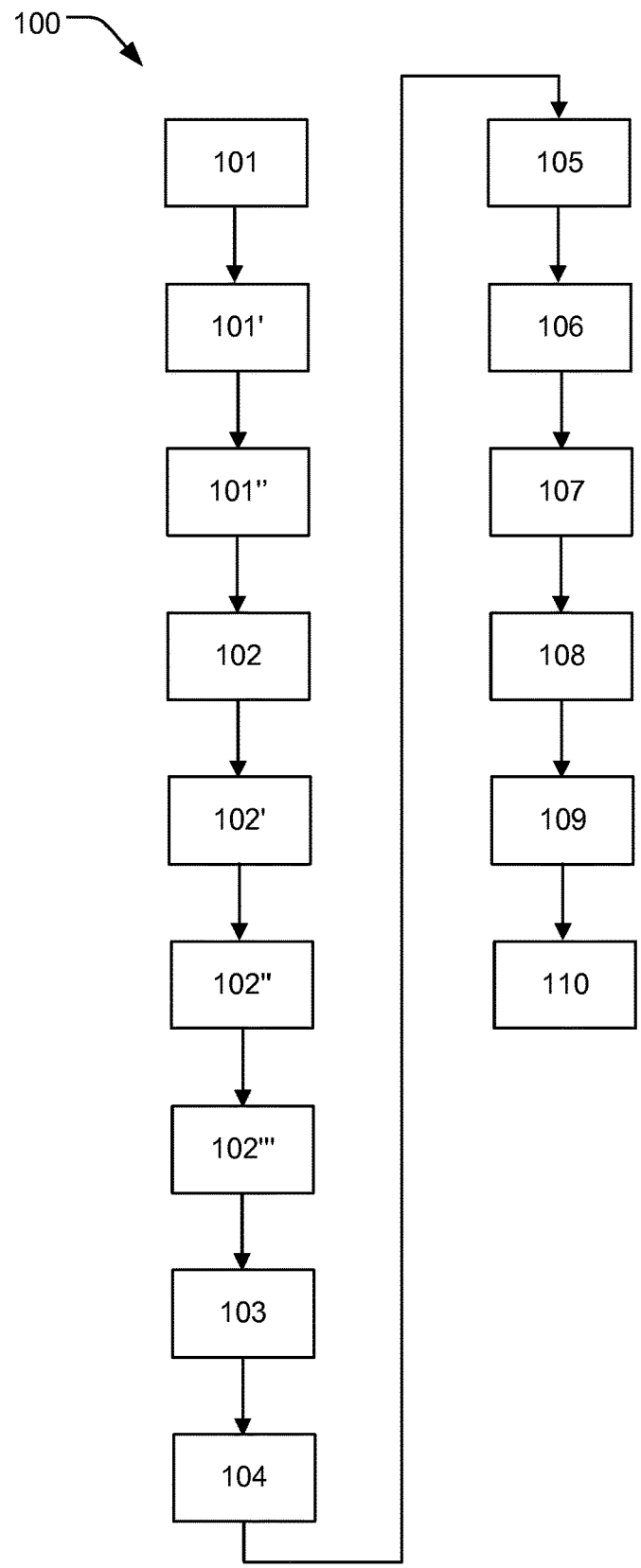

FIG. 8b is a further flowchart of a method of controlling a packaging machine.

DETAILED DESCRIPTION

Embodiments of the invention will now be described more fully hereinafter with reference to the accompanying drawings, in which some, but not all, embodiments of the invention are shown. The invention may be embodied in many different forms and should not be construed as limited to the embodiments set forth herein.

Figure 1:
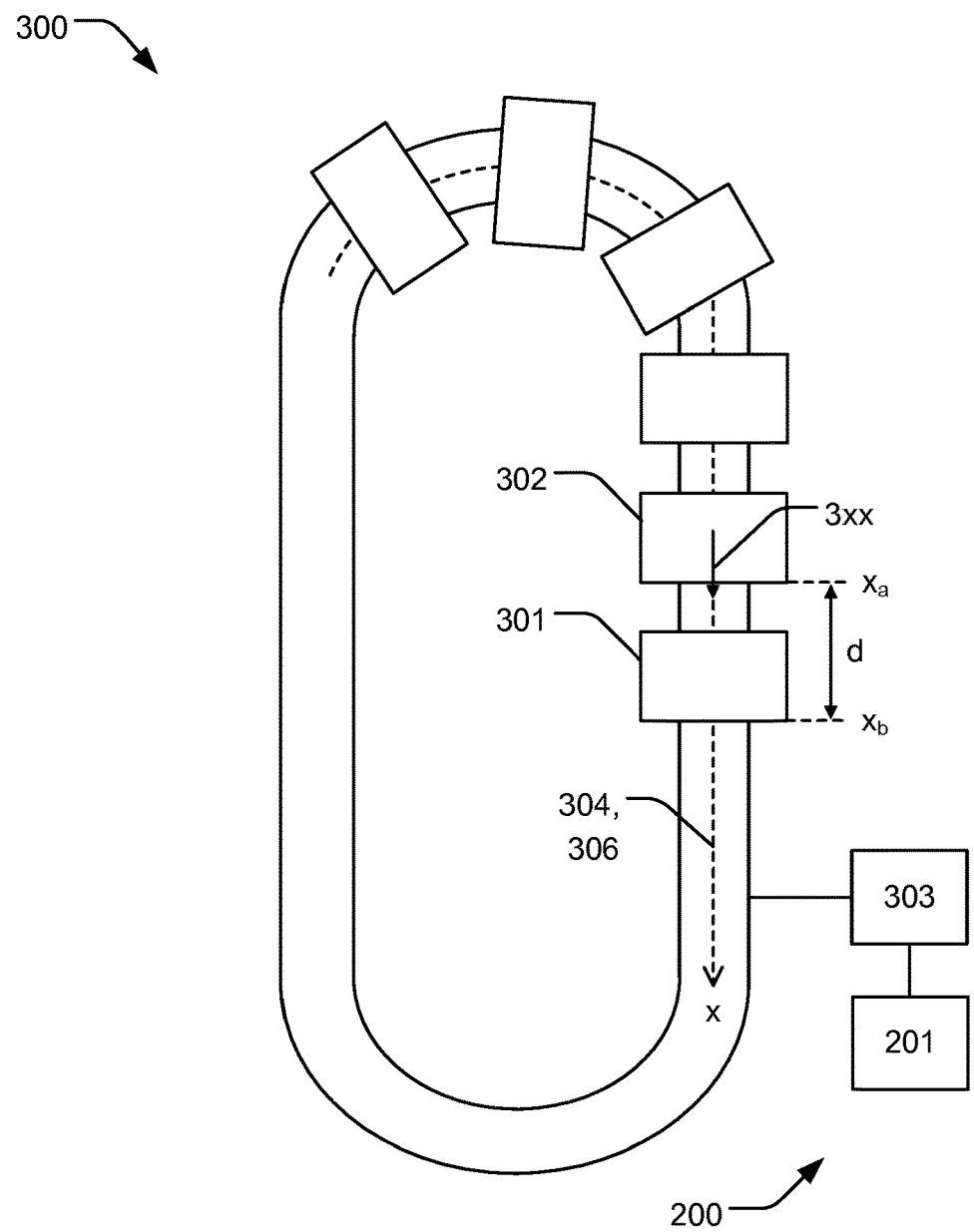
FIG. 1 is a schematic view of a system for controlling a packaging machine comprising a processing unit configured to communicate with a control unit of the packaging machine.

FIG. 1 is a schematic illustration of a system 200 for controlling a packaging machine 300 having a control unit 303 configured to control the positions of independently movable objects 301, 302, along a track 304 of the packaging machine. The independently movable objects 301, 302, are configured to manipulate packaging containers (not shown). The track 304 may be an endless loop as exemplified in FIG. 1. Although the track 304 is shown as an elliptic track, it is conceivable that the track 304 may have varying shapes, i.e. extending along a variety of curves with different radiuses of curvatures. Each of the movable objects 301, 302, occupies a respective object volume 301', 302', in the space of the packaging machine 300 and has a respective object coordinate ($x_a$, $x_b$) in a coordinate system (x) of the track 304. The track 304 and the coordinate system (x), as well as the movable objects 301, 302, and the respective object volumes 301', 302', may be represented in a virtual environment. E.g. the object volumes 301', 302', may be represented by a set of geometrical parameters in a virtual space (x, y, z) that defines the shapes of the object volumes 301', 302'. The object coordinates ($x_a$, $x_b$) may thus define the positions of the object volumes 301', 302', in the virtual space. However, as described further below, the system 200 and method applies both to such virtual environment and to a real-world physical implementation in a packaging machine 300. In the latter case, the coordinate system (x) is also represented in the physical coordinate system of the packaging machine 300, and the movable objects 301, 302, may in a similar manner occupy respective object volumes 301, 302', when moving along the track 104. Thus, moving object volumes 301', 302', of a leading object 301 and a trailing object 302 along a section 305 of the coordinate system (x) as described below should be construed as being applicable to both a virtual representation of the object volumes 301', 302', and to the actual physical space in which the object volumes 301', 302', occupies. Likewise, the coordinate system (x) and a section 305 thereof should be construed as being applicable to a virtual coordinate system (x) or a physical coordinate system (x) in which the packaging machine 300 is located. Thus, for simplification purposes, when referring to object coordinates of the movable objects in the present disclosure it should be understood that reference is being made to both examples, i.e. to the object coordinates in the virtual representation of the coordinate system and to object coordinates in the physical coordinate system.

Figure 2:
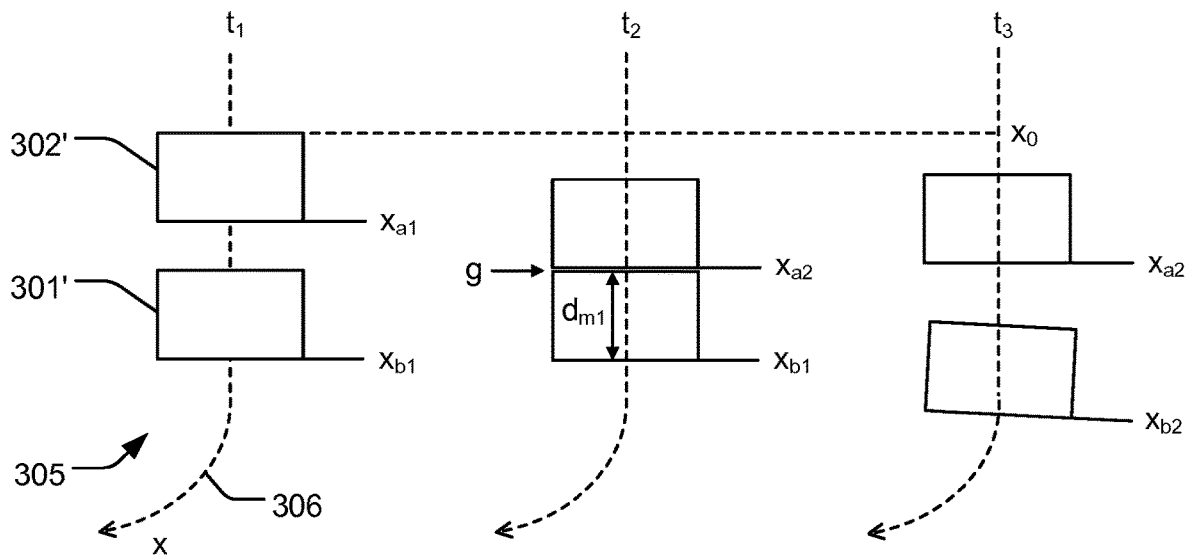
FIG. 2 is a schematic view of the positions of object volumes of a leading and trailing object in a coordinate system at different times.
Figure 2:
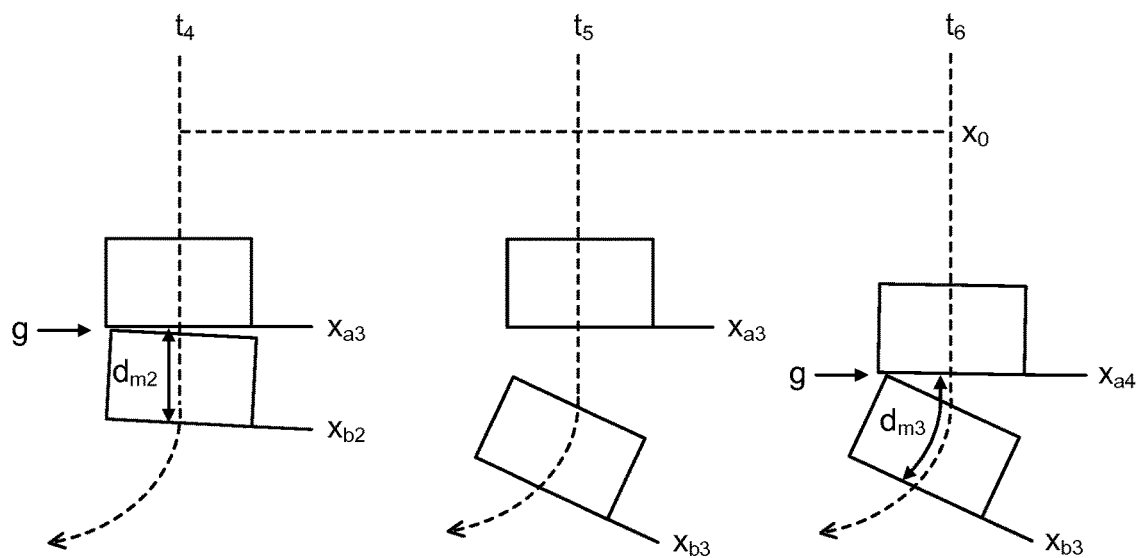

The system 200 comprises a processing unit 201 configured to communicate with the control unit 303. The processing unit 201 is configured to move object volumes 301', 302', of a leading object 301 and a trailing object 302 along a section 305 of the coordinate system (x) in a first direction 306 of the coordinate system. FIG. 2 is a schematic illustration of object volumes 301', 302', being moved along the coordinate system (x). Different positions are shown for different times $t_1$-$t_6$ is as described further below. The object volume 302' of the trailing object 302 is upstream of the object volume 301' of the leading object 301 with respect to the first direction 306. At defined intervals ($x_{b1}$, $x_{b2}$, $x_{b3}$) of object coordinates ($x_b$) of the leading object 301, or the object volume 301' thereof, along the section 305, the processing unit 201 is configured to determine a set of minimum separation distances ($d_{m1}$, $d_{m2}$, $d_{m3}$) between the object coordinates ($x_a$, $x_b$) of the leading and trailing objects over the interval. A minimum separation distance ($d_{m1}$, $d_{m2}$, $d_{m3}$) should be construed in the sense that the space occupied by the object volumes 301', 302', of the leading and trailing objects is different for each minimum separation distance ($d_{m1}$, $d_{m2}$, $d_{m3}$) in the set. Hence, when the object volumes 301', 302', of two adjacent objects are at the minimum separation distance ($d_{m1}$, $d_{m2}$, $d_{m3}$), there is no overlap between the object volumes 301', 302' (in physical space or in the corresponding virtual representation).

Figure 4:
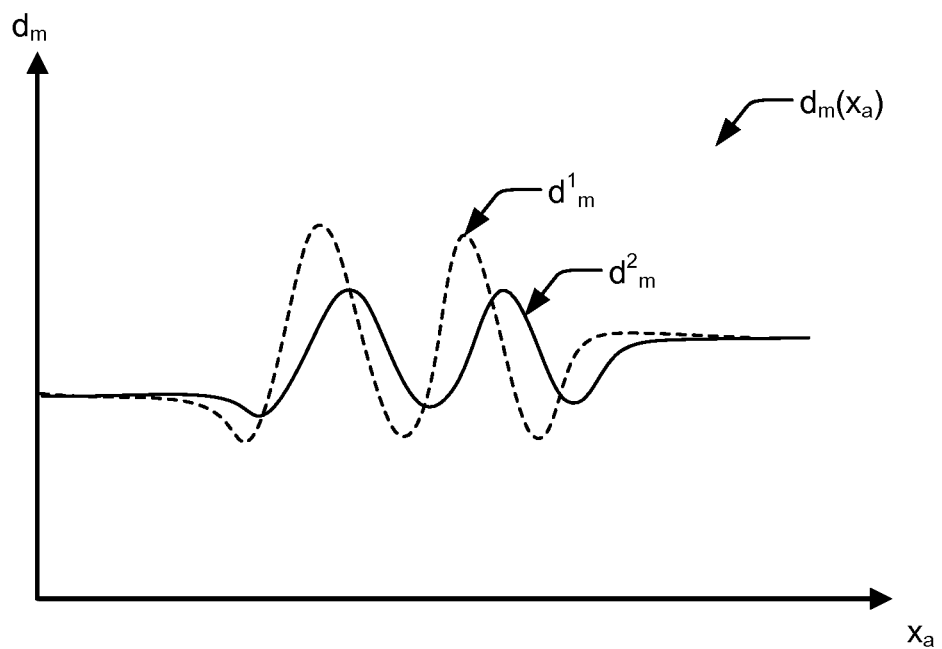
FIG. 4 is a schematic illustration of a function of minimum separation distances between two adjacent objects as function of the objects position along a track.

The processing unit 201 is configured to register object coordinates ($x_{a2}$, $x_{a3}$, $x_{a4}$) of the trailing object at each minimum separation distance ($d_{m1}$, $d_{m2}$, $d_{m3}$) in the set, and associate the object coordinates ($x_{a2}$, $x_{a3}$, $x_{a4}$) of the trailing object and the corresponding minimum separation distances ($d_{m1}$, $d_{m2}$, $d_{m3}$) in a first function ($d_m$). Thus, the first function ($d_m$) describes the minimum separation distances ($d_{m1}$, $d_{m2}$, $d_{m3}$) as function of the object coordinates ($x_{a2}$, $x_{a3}$, $x_{a4}$) of the trailing object. An example of the first function ($d_m$) is shown in FIG. 4. Hence, for a particular object coordinate ($x_{a2}$, $x_{a3}$, $x_{a4}$) of the trailing object 302 at the track 304, the corresponding minimum separation distances ($d_{m1}$, $d_{m2}$, $d_{m3}$) to the leading object 301 can be determined from the first function ($d_m$). For example, at a coordinate position 1500 mm from a zero reference at the track 304 the leading and trailing objects 301, 302—or the associated object volumes 301', 302'—may need to be separated by 200 mm to avoid interference and collision therebetween.

Figure 5:
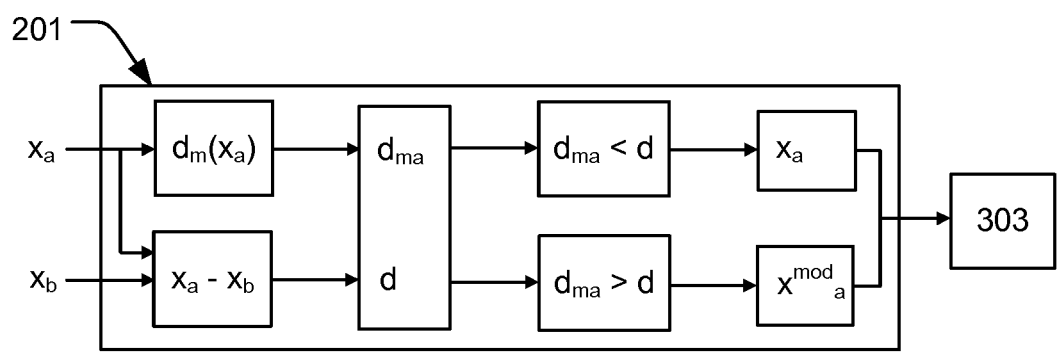
FIG. 5 is a schematic illustration of a flow diagram where a distance between two object coordinates is compared to a minimum separation distance between the two objects.

Then for a selected object coordinate ($x_a$) to be subsequently communicated by the control unit 303 to a selected movable object 302, for moving the selected movable object 302 along the track 304, the processing unit 201 is configured to determine the corresponding minimum separation distance ($d_{ma}$) from the first function ($d_m$) corresponding to the selected object coordinate ($x_a$). The processing unit 201 is further configured to compare the minimum separation distance ($d_{ma}$) from the first function ($d_m$) with a resulting separation (d) between the selected object coordinate ($x_a$) and an object coordinate ($x_b$) of a movable object 301 closest downstream of the selected movable object 302, with respect to a direction of movement of the selected movable object, to determine the resulting separation (d) being smaller or larger than the minimum separation distance ($d_{ma}$). Hence, before the selected movable object 302 is actually moved to the selected object coordinate ($x_a$), the separation (d) between the selected movable object 302 and the adjacent downstream object 301 (see e.g. FIG. 1) that results from such movement is compared to the minimum separation distance ($d_{ma}$) obtained from the previously determined first function ($d_m$). FIG. 5 is schematic illustration where the resulting separation (d) as the difference between $x_a$ and $x_b$ is determined as being smaller or larger than the minimum separation distance ($d_{ma}$). If the resulting separation (d) is larger, then the selected object 302 may proceed and move to object coordinate $x_a$ without risk of interfering with the downstream object 301. If the resulting separation (d) is smaller, then the movement of the selected object 302 can be interrupted or modified so that collision is avoided.

By determining a set of minimum separation distances ($d_{m1}$, $d_{m2}$, $d_{m3}$) between object coordinates ($x_a$, $x_b$) of leading and trailing objects over an interval, and associating the object coordinates and the corresponding minimum separation distances in a first function ($d_m$), provides for determining a subsequent minimum separation associated with a particular coordinate on the track 304 to which a selected object 302 is intended to move. The minimum separation distance between adjacent objects as a function of the track coordinate can accordingly be taken into account and the selected object 302 can be safely moved to intended coordinate ($x_a$) or to a new coordinate ($x^{mod}_a$) so that the required minimum separation distance ($d_{ma}$) is fulfilled. The risk of collisions between objects 301, 302, being independently movable along a track 304 in the packaging machine can thus be minimized. This facilitates calibration and re-positioning procedures of such independently movable objects 301, 302. Collisions can be avoided in a facilitated manner when the movable objects 301, 302, change in shape, volume or in orientation when being conveyed along the track 304.

Figure 3:
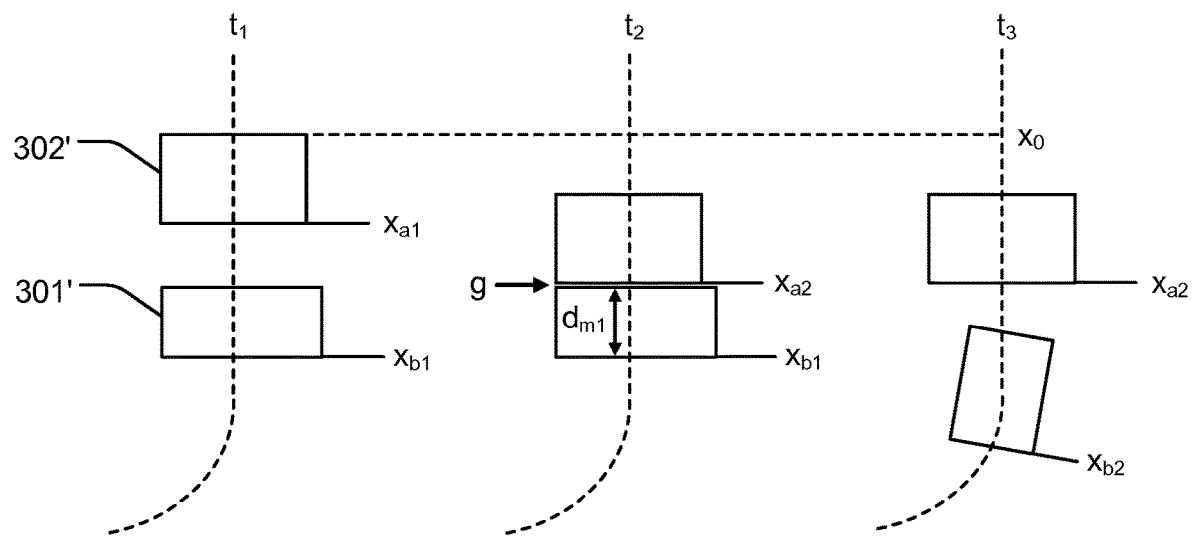
FIG. 3 is a schematic view of the positions of object volumes of a leading and trailing object in a coordinate system at different times, where the objects and the associated volumes thereof change in orientation and size.
Figure 3:
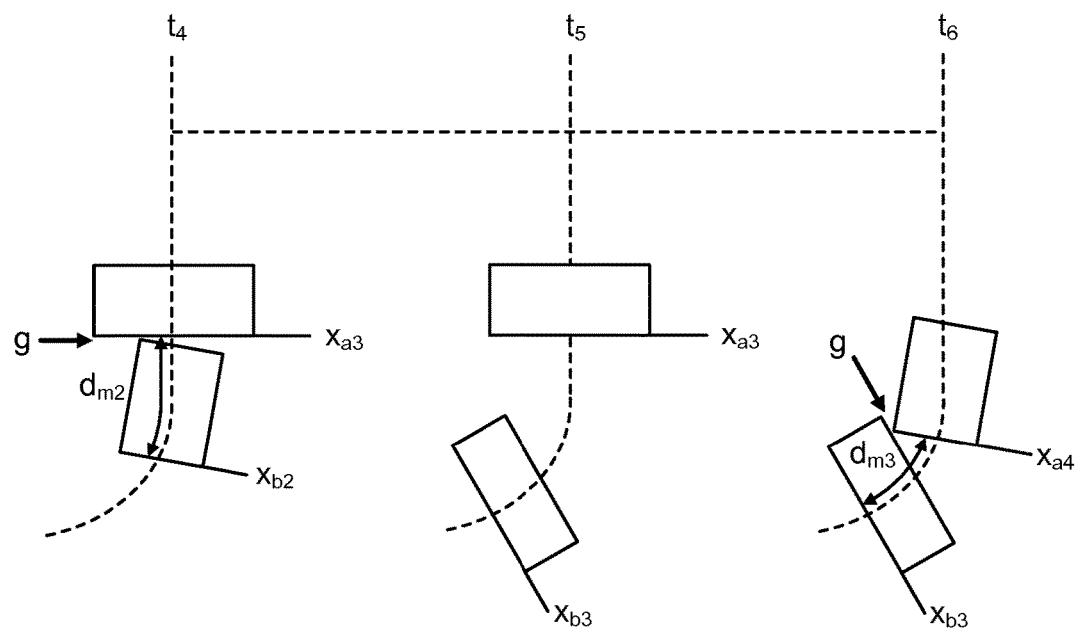

FIGS. 2 and 3 show two examples where the object volume 301' of the leading object 301 is positioned at defined intervals ($x_{b1}$, $x_{b2}$, $x_{b3}$) along a section 305 of the coordinate system (x). For each object coordinate ($x_{b1}$, $x_{b2}$, $x_{b3}$) of the object volume 301', the object volume 302' of the trailing object 302 is moved until reaching the minimum separation distance ($d_{m1}$, $d_{m2}$, $d_{m3}$). E.g. between $t_1$ and $t_2$ the object volume 302' is moved along the coordinate system (x) until separation $d_{m1}$ is reached. At $t_3$ the object volume 301' is moved to the next object coordinate $x_{b2}$ in the interval, and object volume 302' is moved at to until $d_{m2}$ is reached, and so on. The same procedure applies to the case where the shape, volume or orientation varies as exemplified in FIG. 3. The first function ($d_m$) can then be determined as described above and be utilized for avoiding collisions for any subsequent movement along section 305. Such subsequent movement is naturally in the physical coordinate system, whereas the first function ($d_m$) can be determined in a corresponding virtual coordinate system as described above, as well in the physical coordinate system.

The processing unit 201 may be configured to send a modified object coordinate ($x^{mod}_a$) to the control unit 303 when the resulting separation (d) is smaller than the minimum separation distance ($d_{ma}$), as schematically illustrated in FIG. 5. The modified object coordinate ($x^{mod}_a$) positions the selected movable object 302 on the track 304 with resulting separation (d) being larger than the minimum separation distance ($d_{ma}$). The modified object coordinate ($x^{mod}_a$) may be the same as the current object coordinate ($x_a$) of the selected movable object 302 so that there is no movement. Alternatively, the modified object coordinate ($x^{mod}_a$) may position the selected movable object 302 at the minimum separation distance ($d_{ma}$), i.e. as close as possible to the nearest downstream object 301. It is also conceivable that the modified object coordinate ($x^{mod}_a$) positions the selected movable object 302 at any position therebetween.

The processing unit 201 may be configured to determine the minimum separation distance ($d_{m1}$, $d_{m2}$, $d_{m3}$) by being configured to move the object volume 302' of the trailing object 302 in the first direction 306 until contacting the object volume 301' of the leading object 301, e.g. as schematically shown in FIG. 2 at time $t_2$. The processing unit 201 may be further configured to displace the object volumes 301', 302', of the leading and trailing objects with a defined gap (g) along the coordinate system (x), which is also schematically illustrated in e.g. FIG. 2 at time $t_2$. I.e. it may be desirable to have some space between the objects 301, 302, at the minimum separation distance $d_{m1}$ so that the objects 301, 302, avoids contact and for the purpose of having a safety margin. The processing unit 201 may be configured to determine the minimum separation distance ($d_{m1}$, $d_{m2}$, $d_{m3}$) as the resulting difference between the object coordinates ($x_{a2}$-$x_{b1}$; $x_{b2}$-$x_{a3}$; $x_{b3}$-$x_{a4}$) of the leading and trailing objects (or the object volumes thereof 301', 302') after being displaced with the predefined gap (g). Such displacement may accordingly be done for each object coordinate ($x_{b1}$, $x_{b2}$, $x_{b3}$) as schematically illustrated in FIGS. 2 and 3 for determining the minimum separation distances ($d_{m1}$, $d_{m2}$, $d_{m3}$).

The flowchart of FIG. 8a, in conjunction with FIGS. 1-5 as described above, discloses a method 100 of controlling a packaging machine 300 having independently movable objects 301, 302, configured to manipulate packaging containers. The independently movable objects 301, 302, communicate with a control unit 303 configured to control the positions of the independently movable objects 301, 302, along a track 304. Each of the movable objects 301, 302, occupies a respective object volume 301', 302', and has a respective object coordinate ($x_a$, $x_b$) in a coordinate system (x) of the track 304.

The method 100 comprises moving 101 object volumes 301', 302', of a leading object 301 and a trailing object 302 along a section 305 of the coordinate system (x) in a first direction 306 of the coordinate system. The object volume 302' of the trailing object 302 is upstream of the object volume 301' of the leading object 301 with respect to the first direction 306. At defined intervals ($x_{b1}$, $x_{b2}$, $x_{b3}$) of object coordinates ($x_b$) of the leading object 301 along the section 305, the method 100 comprises determining 102 a set of minimum separation distances ($d_{m1}$, $d_{m2}$, $d_{m3}$) between the object coordinates ($x_a$, $x_b$) of the leading and trailing objects over the interval, whereby the space occupied by the object volumes 301', 302', of the leading and trailing object is different for each minimum separation distance ($d_{m1}$, $d_{m2}$, $d_{m3}$) in the set. The method 100 comprises registering 103 object coordinates ($x_{a2}$, $x_{a3}$, $x_{a4}$) of the trailing object at each minimum separation distance ($d_{m1}$, $d_{m2}$, $d_{m3}$) in the set, and associating 104 the object coordinates ($x_{a2}$, $x_{a3}$, $x_{a4}$) of the trailing object and the corresponding minimum separation distances ($d_{m1}$, $d_{m2}$, $d_{m3}$) in a first function ($d_m$).

For a selected object coordinate ($x_a$) to be subsequently communicated by the control unit 303 to a selected movable object 302, for moving the selected movable object 302 along the track 304, the method 100 comprises determining 105 the corresponding minimum separation distance ($d_{ma}$) from the first function ($d_m$). The method 100 comprises comparing 106 the minimum separation distance ($d_{ma}$) from the first function ($d_m$) with a resulting separation (d) between the aforementioned selected object coordinate ($x_a$) and an object coordinate ($x_b$) of a movable object 301 closest downstream of the selected movable object 302, with respect to a direction of movement of the selected movable object 302, to determine 107 the resulting separation (d) as being smaller or larger than the minimum separation distance ($d_{ma}$). The method 100 thus provides for the advantageous benefits as described above in relation to the system 200, in particular allowing for facilitated re-positioning and calibration of independently movable objects 301, 302, in a packaging machine 300 with a reduced risk of collisions between the objects 301, 302. Customization of the process line is also facilitated, as the method 100 facilitates variations in the geometry of the independently movable objects 301, 302. I.e. the function ($d_m$) of minimum separation distances ($d_{m1}$, $d_{m2}$, $d_{m3}$) can be readily determined for any geometry of the movable objects 301, 302, and be subsequently utilized when moving any of the objects along the track 304 to ascertain that the minimum separation distance between adjacent objects is complied with as described above.

FIG. 8b is a further flowchart of a method 100 of controlling a packaging machine 300. The method 100 may comprise sending 108 a modified object coordinate ($x^{mod}_a$) to the control unit 303 when the resulting separation (d) is smaller than the minimum separation distance ($d_{ma}$), as described above. The modified object coordinate ($x^{mod}_a$) positions the selected movable object 302 on the track 304 with resulting separation (d) being larger than the minimum separation distance ($d_{ma}$).

Determining the minimum separation distance ($d_{m1}$, $d_{m2}$, $d_{m3}$) may comprise moving 102' the object volume 302' of the trailing object 302 in the first direction 306 until contacting the object volume 301' of the leading object 301, displacing 102'' the object volumes 301', 302', of the leading and trailing objects with a defined gap (g) along the coordinate system (x), and determining 102''' the minimum separation distance ($d_{m1}$, $d_{m2}$, $d_{m3}$) as the resulting difference between the object coordinates ($x_{a2}$-$x_{b1}$; $x_{b2}$-$x_{a3}$; $x_{b3}$-$x_{a4}$) of the leading and trailing objects after said displacing.

For each object coordinate ($x_b$) of the leading object in the defined interval ($x_{b1}$, $x_{b2}$, $x_{b3}$), the method 100 may comprise maintaining a position of the object volume 301' of the leading object while moving the object volume 302' of the trailing object towards the object volume 301' of the leading object until the minimum separation distance ($d_{m1}$, $d_{m2}$, $d_{m3}$) is determined. This is exemplified in e.g. FIG. 2 where object volume 301' of the leading object 301 is maintained at position $x_{b1}$ between $t_1$ and $t_2$ when the object volume 302' of the trailing object is moved forward or downstream until reaching the minimum separation distance $d_{m1}$. An analogous movement takes place between $t_3$ and $t_4$, as well as between $t_5$ and $t_6$.

The method 100 may comprise defining 101' a plurality of contact regions 307, 307', 308, 308', for each of the object volumes 301', 302', of the leading and trailing objects. FIG. 6 is a schematic illustration of contact regions 307, 307', of object volume 301', and contact regions 308, 308', of object volume 302'. The method 100 may comprise moving 101'' the object volume 302' of the trailing object until any of the contact regions 307, 307', of the object volume 302' of the trailing object intersect the object volume 301' of the leading object. Alternatively, or in addition, the method 100 may comprise moving 101'' the object volume 302' of the trailing object until any of the contact regions 308, 308', of the object volume 301' of the leading object intersect the object volume 302' of the trailing object. In either case, the plurality of contact regions 307, 307', 308, 308', provides for facilitating the detection of the intersection of the object volumes 301', 302'. As described above, the object volumes 301', 302', may then be displaced with the predefined gap (g) in order to obtain the minimum separation distance ($d_{m1}$, $d_{m2}$, $d_{m3}$). The plurality of contact regions 307, 307', 308, 308', may be implemented as virtual sensors in case the object volumes 301', 302', are virtual representations in a virtual coordinate system as described above. It is conceivable however that the plurality of contact regions 307, 307', 308, 308', may comprise physical sensor units in case the object volumes 301', 302', are the actual volumes of the movable objects 301, 302, in the physical space. In either case the plurality of contact regions 307, 307', 308, 308', may be arranged at various parts of the object volumes 301', 302', where collision may be expected, e.g. at protruding or moving portions. FIG. 6 show one example of how such plurality of contact regions 307, 307', 308, 308', may be arranged but it should be understood that the placement may be optimized to different applications.

The track 304 may be an endless loop, as exemplified in FIG. 1. The defined intervals ($x_{b1}$, $x_{b2}$, $x_{b3}$) of object coordinates may be defined along a section 305 of the coordinate system that circumfers the endless loop 304. I.e. the defined intervals ($x_{b1}$, $x_{b2}$, $x_{b3}$) of object coordinates may be placed around the entire loop 304. This allows for determining the function of minimum separation distances ($d_{m1}$, $d_{m2}$, $d_{m3}$) over the entire loop 304. A movable object 302 may then be safely moved to any part of the track 304 while taking into account the minimum separation distances ($d_{m1}$, $d_{m2}$, $d_{m3}$) as described above.

The method 100 may comprise determining 109 the first function ($d^1_m$) of minimum separation distances for the object volumes 301', 302', moved in the first direction 306, and determining 110 a second function ($d^2_m$) of minimum separation distances for the object volumes 301', 302', moved in a second direction 309 opposite the first direction 306. The leading object in the first direction 306 is the trailing object in the second direction 309. This is exemplified in FIGS. 7a-b where FIG. 7a show movement in the first direction, for which the first function ($d^1_m$) of minimum separation distances is determined, and FIG. 7b show movement in the second direction, for which the second function ($d^2_m$) of minimum separation distances is determined. An object 302 to be subsequently moved along the track 304 may thus safely approach an adjacent object from above, as in FIG. 7a, or from below, as in 7b, by utilizing the respective first or second function ($d^1_m$, $d^2_m$). Both the first and second functions ($d^1_m$, $d^2_m$) may be determined for the complete loop 304 as described above.

As mentioned, the object volumes 301', 302', may be virtual volumes and said movement thereof in the coordinate system may be a virtual movement. Further, the first function ($d_m$) may be determined from the aforementioned virtual movement. The object volumes 301', 302', and the movement thereof in a virtual coordinate system may be based on previously established models in modelling software such as various CAD models.

A computer program product is provided comprising instructions which, when the program is executed by a computer, cause the computer to carry out the steps of the method 100 as described above in relation to FIGS. 1-8.

A packaging machine is provided (not shown) which comprises a system 200 as described above in relation to FIGS. 1-7, and/or which performs the method 100 as described above in relation to FIGS. 1-8. The packaging machine 300 thus provides for the advantageous benefits as described above in relation to the system 200 and the method 100.

From the description above follows that, although various embodiments of the invention have been described and shown, the invention is not restricted thereto, but may also be embodied in other ways within the scope of the subject-matter defined in the following claims.

The invention claimed is:

1. A method of controlling a packaging machine comprising independently movable objects configured to manipulate packaging containers, the independently movable objects communicating with a control unit configured to control positions of the independently movable objects along a track, each of the movable objects occupying a respective object volume and having a respective object coordinate in a coordinate system of the track, the method comprising:
   moving object volumes of a leading movable object and a trailing movable object along a section of the coordinate system in a first direction of the coordinate system, the object volume of the trailing movable object being upstream of the object volume of the leading movable object with respect to the first direction,
   at defined intervals of object coordinates of the leading movable object along the section:
      determining a set of minimum separation distances between the object coordinates of the leading and trailing movable objects over an interval of the defined intervals, whereby the space occupied by the object volumes of the leading and trailing movable object is different for each minimum separation distance in the set,
      registering object coordinates of the trailing movable object at each minimum separation distance in the set, and
      associating the object coordinates of the trailing movable object and corresponding minimum separation distances in a first function, and
   for a selected object coordinate to be subsequently communicated by the control unit to a selected movable object for moving the selected movable object along the track:
      determining the corresponding minimum separation distance from the first function, and
      comparing the minimum separation distance from the first function with a resulting separation between said selected object coordinate and an object coordinate of a movable object closest downstream of the selected movable object, with respect to a direction of movement of the selected movable object, to determine the resulting separation as being smaller or larger than the minimum separation distance.

2. The method according to claim 1, further comprising:
   sending a modified object coordinate to the control unit responsive to said resulting separation being smaller than the minimum separation distance, whereby the modified object coordinate positions the selected movable object on the track with resulting separation being larger than the minimum separation distance.

3. The method according to claim 1, wherein determining the minimum separation distance comprises:
   moving the object volume of the trailing movable object in the first direction until contacting the object volume of the leading movable object,
   displacing the object volumes of the leading and trailing movable objects with a defined gap along the coordinate system, and
   determining the minimum separation distance as the resulting difference between the object coordinates of the leading and trailing movable objects after said displacing.

4. The method according to claim 3, further comprising:
   defining a plurality of contact regions for each of the object volumes of the leading and trailing movable objects, and
   moving the object volume of the trailing movable object until:
      any of the contact regions of the object volume of the trailing movable object intersect the object volume of the leading movable object, or any of the contact regions of the object volume of the leading movable object intersect the object volume of the trailing movable object.

5. The method according to claim 1, wherein, for each object coordinate of the leading movable object in the interval, the method comprises maintaining a position of the object volume of the leading movable object while moving the object volume of the trailing movable object towards the object volume of the leading movable object until the minimum separation distance is determined.

6. The method according to claim 1, wherein the track comprises an endless loop and wherein said defined intervals of object coordinates are defined along a section of the coordinate system that circumscribes the endless loop.

7. The method according to claim 6, further comprising:
determining the first function of minimum separation distances for the object volumes moved in the first direction, and
determining a second function of minimum separation distances for the object volumes moved in a second direction opposite the first direction,
wherein the leading movable object in the first direction is the trailing movable object in the second direction.

8. The method according to claim 1, further comprising moving virtual object volumes corresponding to the object volumes of the leading movable object and the trailing movable object along a virtual section of a virtual coordinate system corresponding to the coordinate system in the first direction of the coordinate system, wherein the coordinate system comprises a physical coordinate system.

9. The method according to claim 8, wherein the first function is determined from said movement thereof in the virtual coordinate system.

10. A system for controlling a packaging machine comprising a control unit configured to control positions of independently movable objects along a track of the packaging machine, the independently movable objects being configured to manipulate packaging containers, each of the movable objects occupying a respective object volume and having a respective object coordinate in a coordinate system of the track, the system comprising:
a processing unit configured to communicate with the control unit and being configured to:
move object volumes of a leading movable object and a trailing movable object along a section of the coordinate system in a first direction of the coordinate system, the object volume of the trailing movable object being upstream of the object volume of the leading movable object with respect to the first direction,
wherein, at defined intervals of object coordinates of the leading movable object along the section, the processing unit is configured to:
determine a set of minimum separation distances between the object coordinates of the leading and trailing movable objects over an interval of the defined intervals, whereby the space occupied by the object volumes of the leading and trailing movable objects is different for each minimum separation distance in the set,
register object coordinates of the trailing movable object at each minimum separation distance in the set, and
associate the object coordinates of the trailing movable object and corresponding minimum separation distances in a first function, and
for a selected object coordinate to be subsequently communicated by the control unit to a selected movable object for moving the selected movable object along the track, the processing unit is configured to:
determine the corresponding minimum separation distance from the first function, and
compare the minimum separation distance from the first function with a resulting separation between said selected object coordinate and an object coordinate of a movable object closest downstream of the selected movable object, with respect to a direction of movement of the selected movable object, to determine the resulting separation being smaller or larger than the minimum separation distance.

11. The system according to claim 10, wherein the processing unit is further configured to:
send a modified object coordinate to the control unit responsive to said resulting separation being smaller than the minimum separation distance, whereby the modified object coordinate positions the selected movable object on the track with resulting separation being larger than the minimum separation distance.

12. The system according to claim 10, wherein the processing unit is configured to determine the minimum separation distance by being configured to:
move the object volume of the trailing movable object in the first direction until contacting the object volume of the leading movable object,
displace the object volumes of the leading and trailing movable objects with a defined gap along the coordinate system, and
determine the minimum separation distance as the resulting difference between the object coordinates of the leading and trailing movable objects after said displacing.

13. The system according to claim 12, wherein the processing unit is further configured to:
define a plurality of contact regions for each of the object volumes of the leading and trailing movable objects, and
move the object volume of the trailing movable object until:
any of the contact regions of the object volume of the trailing movable object intersect the object volume of the leading movable object, or
any of the contact regions of the object volume of the leading movable object intersect the object volume of the trailing movable object.

14. The system according to claim 10, further comprising the packaging machine.

15. The system according to claim 10, wherein, for each object coordinate of the leading movable object in the interval, the processing unit is configured to maintain a position of the object volume of the leading movable object while moving the object volume of the trailing movable object towards the object volume of the leading movable object until the minimum separation distance is determined.

16. The system according to claim 10, wherein the track comprises an endless loop and wherein said defined intervals of object coordinates are defined along a section of the coordinate system that circumscribes the endless loop.

17. The system according to claim 16, wherein the processing unit is further configured to:
determine the first function of minimum separation distances for the object volumes moved in the first direction, and determine a second function of minimum separation distances for the object volumes moved in a second direction opposite the first direction, wherein the leading movable object in the first direction is the trailing movable object in the second direction.

18. The system according to claim 10, wherein the processing unit is further configured to:

move virtual object volumes corresponding to the object volumes of the leading movable object and the trailing movable object along a virtual section of a virtual coordinate system corresponding to the coordinate system in the first direction of the coordinate system, the coordinate system comprising a physical coordinate system, wherein the first function is determined from said movement thereof in the virtual coordinate system.

19. A non-transitory storage medium storing instructions which, when executed by a computer configured to control a package machine comprising independently movable objects communicating with the computer, the computer configured to control positions of the independently movable objects along a track, each of the movable objects occupying a respective object volume and having a respective object coordinate in a coordinate system of the track, the instructions causing the computer to:

move object volumes of a leading movable object and a trailing movable object along a section of a coordinate system in a first direction of the coordinate system, the object volume of the trailing movable object being upstream of the object volume of the leading movable object with respect to the first direction, at defined intervals of object coordinates of the leading movable object along the section:

determine a set of minimum separation distances between the object coordinates of the leading and trailing movable objects over an interval of the defined intervals, whereby the space occupied by the object volumes of the leading and trailing movable object is different for each minimum separation distance in the set, register object coordinates of the trailing movable object at each minimum separation distance in the set, and associate the object coordinates of the trailing movable object and corresponding minimum separation distances in a first function, and for a selected object coordinate to be subsequently communicated by the computer to a selected movable object for moving the selected movable object along the track:

determining the corresponding minimum separation distance from the first function, and comparing the minimum separation distance from the first function with a resulting separation between said selected object coordinate and an object coordinate of a movable object closest downstream of the selected movable object. with respect to a direction of movement of the selected movable object, to determine the resulting separation as being smaller or larger than the minimum separation distance.

* * * * *